United States Patent
Yang

(10) Patent No.: US 6,689,503 B2
(45) Date of Patent: Feb. 10, 2004

(54) FUEL CELL WITH UNIFORM COMPRESSION DEVICE

(75) Inventor: Jefferson Y S Yang, Orange, CA (US)

(73) Assignee: Asia Pacific Fuel Cell Technologies, Ltd., Taipei (TW)

( * ) Notice: Subject to any disclaimer, the term of this patent is extended or adjusted under 35 U.S.C. 154(b) by 237 days.

(21) Appl. No.: 09/938,989

(22) Filed: Aug. 24, 2001

(65) Prior Publication Data

US 2002/0110722 A1 Aug. 15, 2002

(30) Foreign Application Priority Data

Feb. 15, 2001 (TW) ........................ 90103424 A

(51) Int. Cl.[7] .................. H01M 2/00; H01M 2/02; H01M 2/08; F04B 43/00; F04B 45/02
(52) U.S. Cl. .................. 429/37; 429/34; 417/472; 417/479
(58) Field of Search .............. 429/12, 13, 34, 429/35, 36, 37, 38, 39; 417/234, 472, 478, 479

(56) References Cited

U.S. PATENT DOCUMENTS

| | | | |
|---|---|---|---|
| 4,619,589 A | | 10/1986 | Muller et al. |
| 4,824,340 A | * | 4/1989 | Bruggeman et al. ........ 417/479 |
| 4,966,528 A | | 10/1990 | Henkel et al. |
| 5,246,351 A | | 9/1993 | Horn et al. |
| 5,252,410 A | * | 10/1993 | Wilkinson et al. ............ 429/33 |
| 5,484,666 A | * | 1/1996 | Gibb et al. .................... 429/34 |
| 5,547,777 A | * | 8/1996 | Richards ....................... 429/32 |
| 5,773,160 A | * | 6/1998 | Wilkinson et al. ............ 429/13 |
| 5,798,186 A | | 8/1998 | Fletcher et al. |
| 5,840,438 A | * | 11/1998 | Johnson et al. ............... 429/30 |
| 6,132,449 A | * | 10/2000 | Lum et al. .................. 606/181 |
| 6,200,698 B1 | * | 3/2001 | Carlstrom, Jr. .............. 429/34 |
| 6,464,846 B1 | * | 10/2002 | Titterington ................ 204/267 |

FOREIGN PATENT DOCUMENTS

| | | | |
|---|---|---|---|
| EP | 0 741 428 A1 | | 4/1995 |
| JP | 3-113188 | * | 5/1998 ............. F16L/9/06 |

OTHER PUBLICATIONS

European Search Report for EP 02 01 4823 dated Feb. 13, 2003, 3 pages, European Patent Office.

* cited by examiner

Primary Examiner—Bruce F. Bell
Assistant Examiner—Donald V. Scaltrito
(74) Attorney, Agent, or Firm—Rosenberg, Klein & Lee

(57) ABSTRACT

This invention is related to a fuel cell, comprising: a fuel cell stack; two end plates provided at the longitudinal, opposing ends of the cell stack; a plurality of tie rods, passing through a peripheral region of each end plate for positioning the cell stack between the two end plates; and at least one uniform compression device, positioned between the cell stack and one of the end plates, wherein the uniform compression device includes at least one pressure bellows that constantly applies a consistent and distributed operative contact pressure towards the cell stack for enhancing the conductivity and operative efficiency of the fuel cell.

7 Claims, 5 Drawing Sheets

FUEL CELL WITH UNIFORM COMPRESSION DEVICE

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention is related to a fuel cell, in particular to a hydrogen fuel cell having a uniform compression device that constantly applies a consistent and distributed operative contact pressure towards a cell stack for enhancing the conductivity and operative efficiency of the fuel cell.

2. Description of the Related Art

With the rapid growth of human civilization the consumption of traditional energy sources, such as coal, oil and natural gas, increases rapidly. This results in serious pollution to the global environment and causes various environmental problems such as global warming and acid rain. It is now recognized that the existing natural energy resources are limited. Therefore, if the present rate of energy consumption continues, all existing natural energy sources will be exhausted in the near future. Accordingly, many developed countries are dedicated to the research and development of new and alternative energy sources. The fuel cell is one of the most important and reasonably priced energy sources. Compared with traditional internal combustion engines, the fuel cell has many advantages such as high energy conversion efficiency, clean exhaust, low noise, and no consumption of traditional gasoline.

In brief, a fuel cell is an electrical power generation device powered by the electrochemical reaction of hydrogen and oxygen. Basically, the reaction is a reverse reaction of the electrolysis of water, to convert the chemical energy into electrical energy. The basic structure of a fuel cell, for example, a proton exchange membrane fuel cell, comprises a plurality of cell units. Each cell unit comprises a proton exchange membrane (PEM) at the middle, with the two sides thereof provided with a layer of catalyst, each of the two outsides of the catalyst is further provided with a gas diffusion layer (GDL). An anode plate and a cathode plate are further provided at the outermost sides adjacent to the GDL. After combining all the above elements together, a cell unit is formed.

For the practical application of a fuel cell, a plurality of the above cell units are stacked and serially connected to provide sufficient power to construct a cell stack, as illustrated in FIG. 1. The cell stack 10 is positioned between two end plates 12, 13 provided at the longitudinal, opposing ends of the cell stack. A tightening device, such as a plurality of tie rods 14, passes through a peripheral region of each end plate 12, 13 for positioning the cell stack 10 between the two end plates 12, 13.

While performing the aforesaid reverse reaction of the electro-dissociation of water, in order to convert the chemical energy into electrical energy, the cell stack must be maintained under a consistent pressure range so as to ensure that the reverse reaction of the electro-dissociation of water is performed under the optimum pressure condition, so as to enhance the conversion efficiency of the chemical energy into electrical energy.

FIG. 2 illustrates a conventional fuel cell, comprising the aforesaid fuel stack 10, two end plates, 12, 13, and a plurality of tie rods 14. Such a conventional fuel cell further includes a plurality of resilient members 50, such as springs, that are affixed between the lower end plate 13 and each of the tie rods 14. Adjustment can be made as to how tight each of the tie rods 14 should be affixed to the end plates, to such a degree that the rebounding force of each of the resilient member 50 being applied to the lower end plate 13 is approximately equal to the contact pressure required for optimizing the conductivity of each cell unit.

Obviously, the object of such a conventional measure for maintaining the pressure is achieved by adjusting the pressure being applied to the lower end plate 13 where each of the resilient members 50 is located. Hence, such a conventional measure can only ensure that the operative pressure neighboring the resilient member 50 can be maintained within a required range, while failing to effectively control the operative pressure at locations remote from the resilient members (or the tie rods 14).

Furthermore, while tightening the tie rods, in order to ensure that each cell unit is under a consistent pressure, precise measurements must be made to each of the tie rods 14 during the tightening process, which complicates the process and increases the cost for manufacturing the fuel cell.

BRIEF SUMMARY OF THE INVENTION

The primary objective of this invention is to overcome the disadvantages of the conventional pressure-maintaining device and to provide a uniform compression device that is able to constantly apply a consistent pressure towards a cell stack. Further, such a uniform compression device can be adapted to adjust the pressure variation caused by thermal expansion, and to compensate for the height deviation resulting from stacking the cell units into a cell stack, thereby enhancing the operative efficiency of the fuel cell.

The major technical content of this invention is to implement a metallic pressure bellows that is positioned between the cell stack and one of the end plates. Because the pressure bellows is made of metal materials, the tendency of pressure leakage is reduced. Further, the pressure bellows constantly applies pressure to the cell stack in a "planar" manner such that the complicated processes required adjusting the conventional pressure maintaining device can be eliminated. The pressure bellows further prevent the pressure being applied to the cell stack from varying with respect to the locations of the tie rods.

The structures and characteristics of this invention can be realized by referring to the appended drawings and explanations of the preferred embodiments.

BRIEF DESCRIPTION OF THE SEVERAL VIEWS OF THE DRAWINGS

FIG. 3b is a cross-sectional view taken along lines 3b—3b of FIG. 3a;

DETAILED DESCRIPTION OF THE INVENTION

Figure 4:
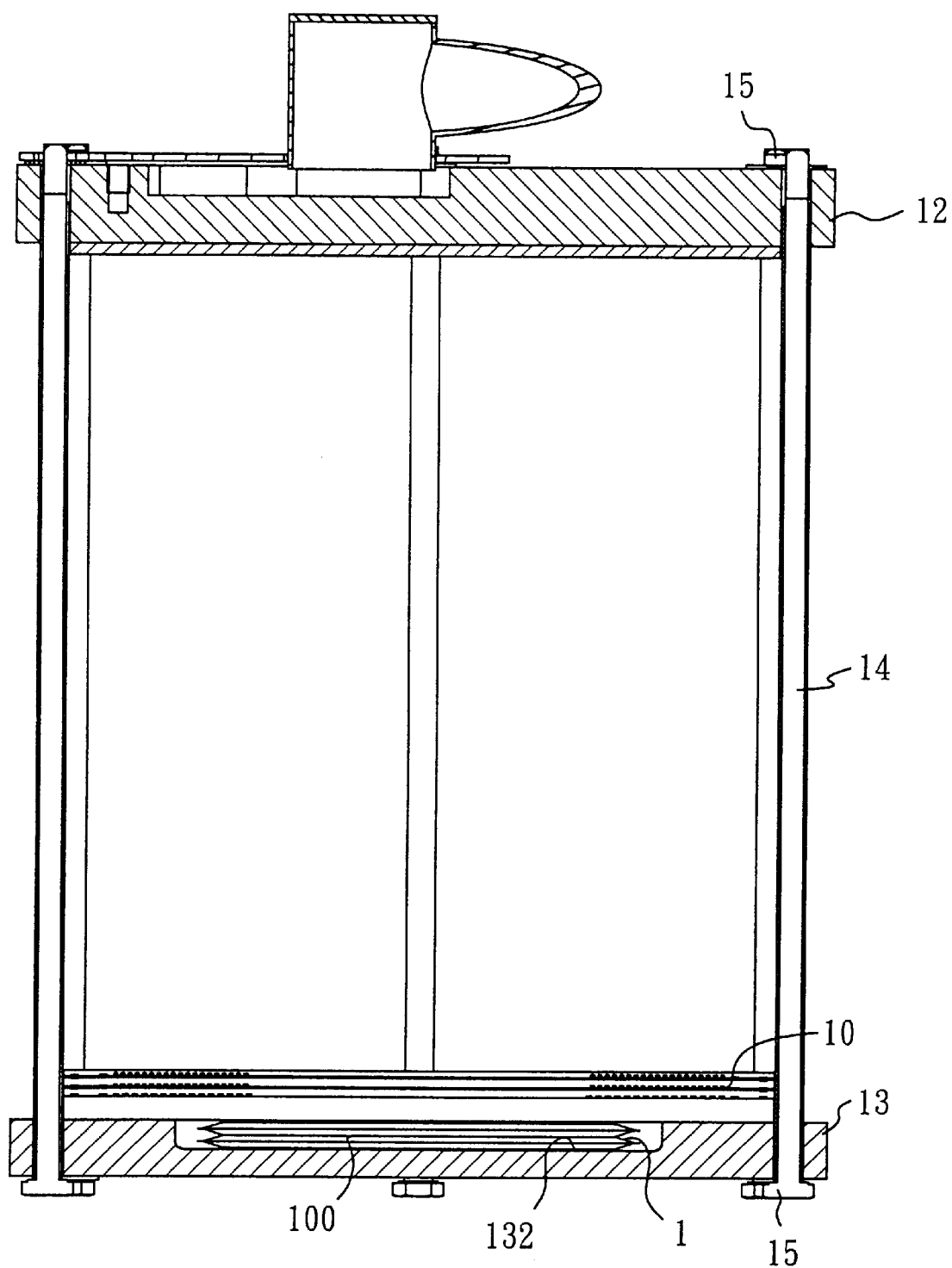
FIG. 4 is a cross-sectional, schematic view showing a fuel cell with a uniform compression device according to a preferred embodiment of this invention.

As illustrated in FIG. 4, the fuel cell comprises: a fuel cell stack 10; an upper end plate 12 and a lower end plate 13; a plurality of tie rods 14; and a uniform compression device 100.

As shown in FIG. 4, the end plates 12, 14 each have a central region and a peripheral region and are disposed at the longitudinal, opposing ends of the cell stack 10. The tie rods 14 pass through the peripheral region of the two end plates 12, 13 and position the cell stack 10 between the central regions of the two end plates 12, 13 by means of bolts 15.

Figure 1:
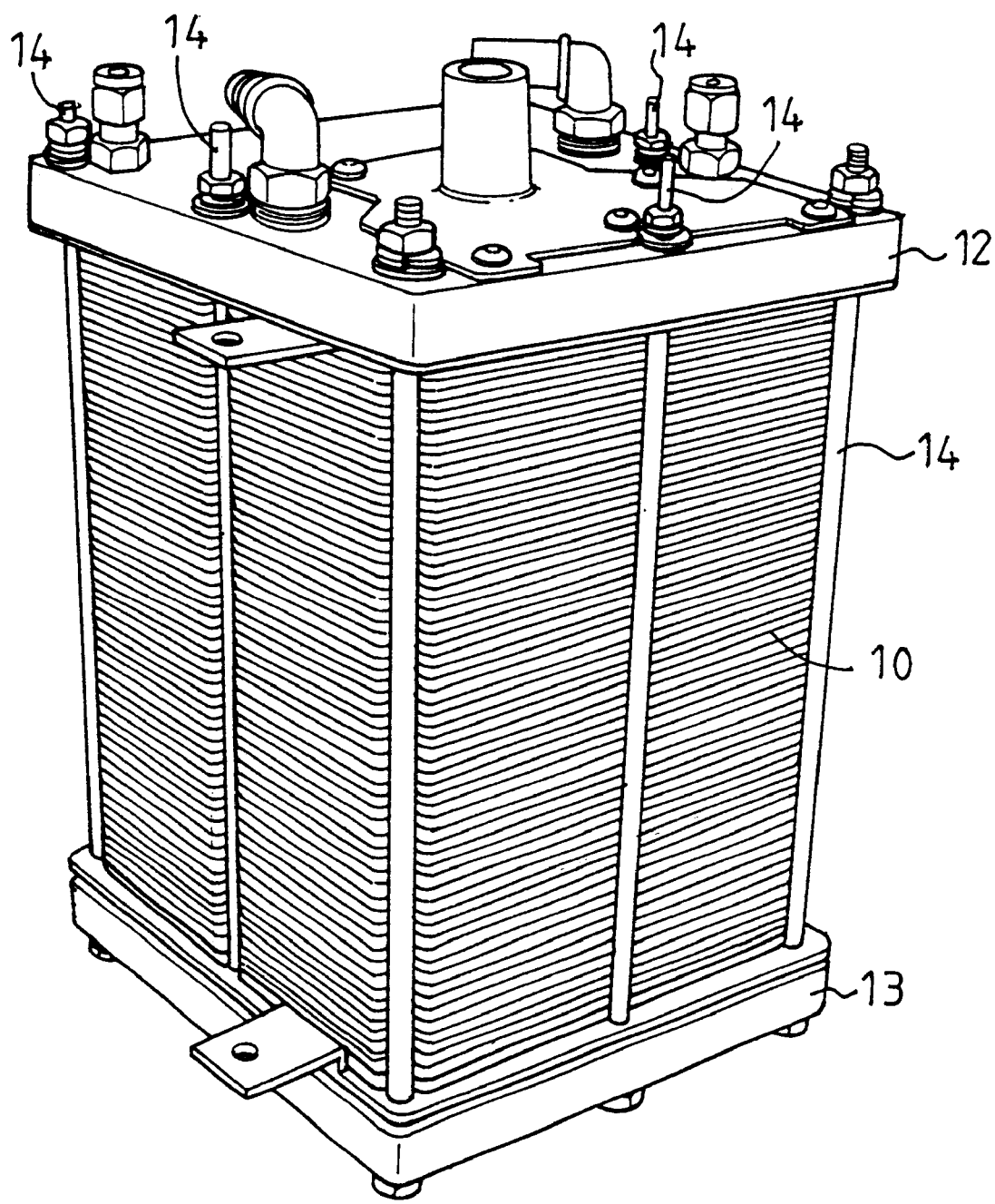
FIG. 1 is a perspective view of a fuel cell.
Figure 2:
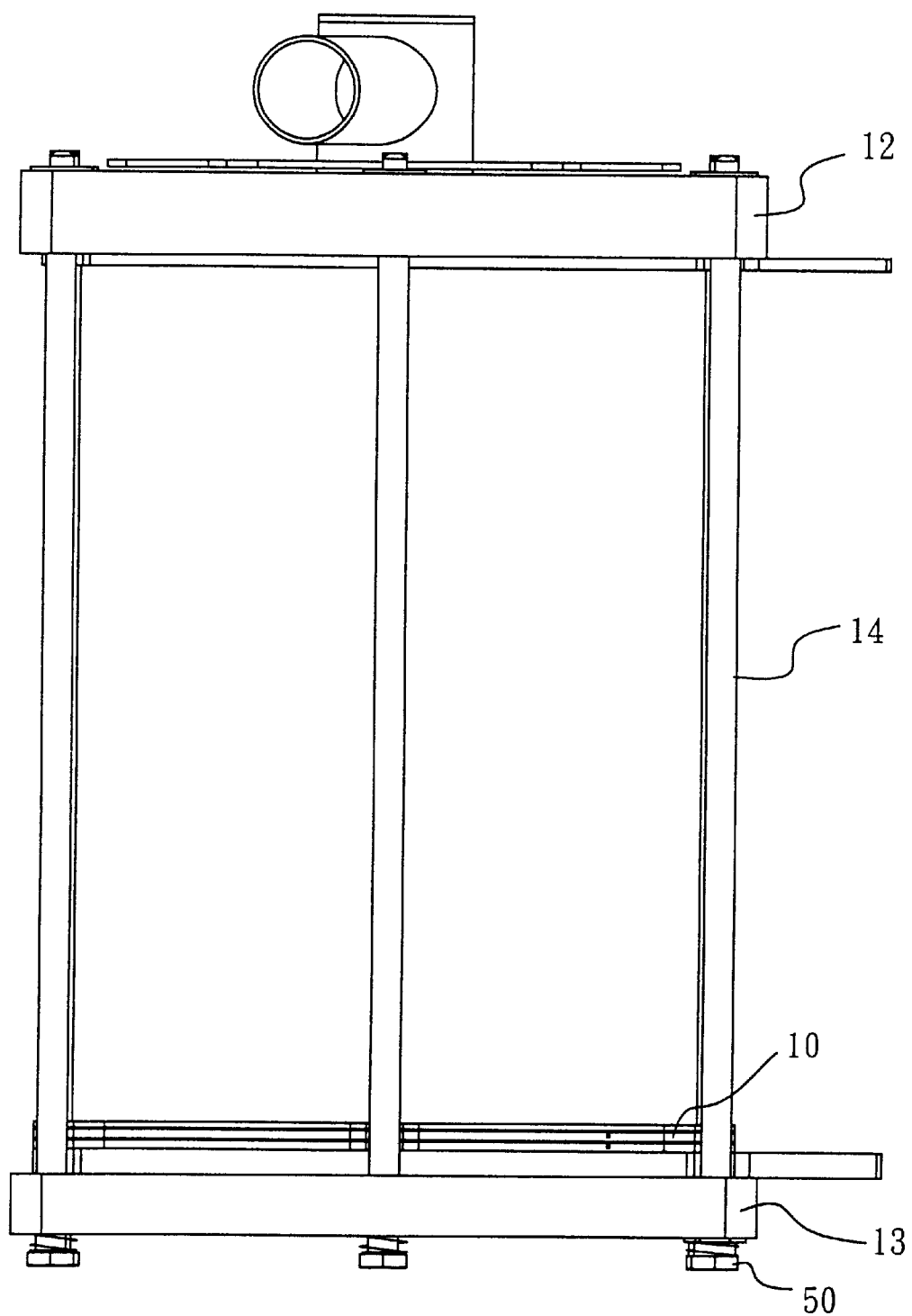
FIG. 2 illustrates a fuel cell having a conventional pressure-maintaining device.
Figure 3A:
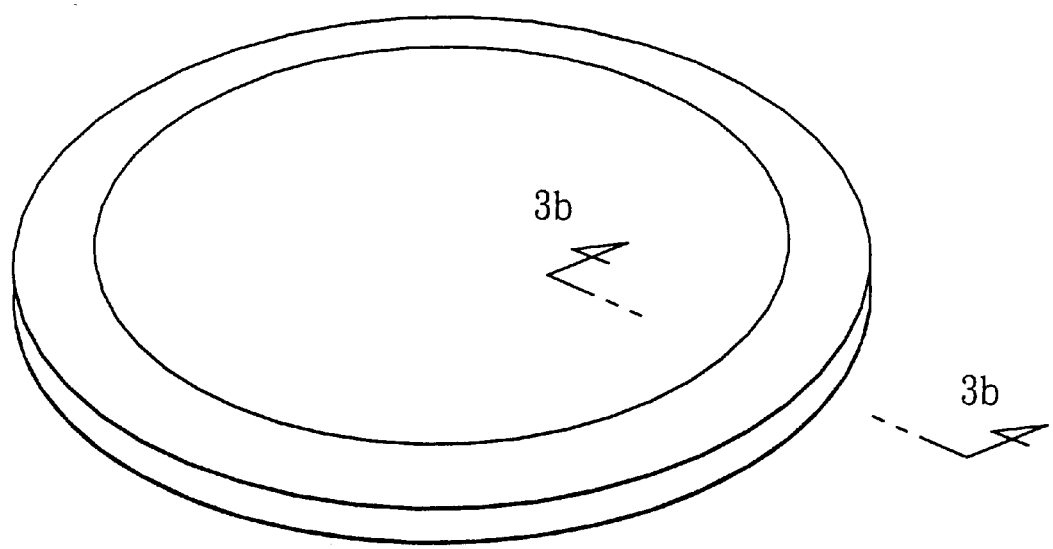
FIG. 3a is a perspective view illustrating a uniform compression device of this invention.
Figure 3B:
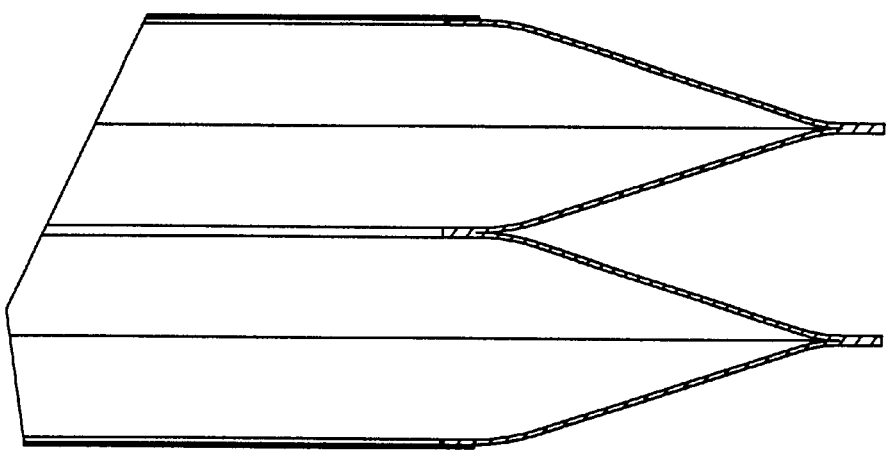

FIG. 3a is a perspective view illustrating a uniform compression device 100 of this invention; FIG. 3b is a cross-sectional view taken along lines 3b—3b of FIG. 3a, where the uniform compression device 100 comprises a pressure bellows made of a metallic material.

In order to facilitate placement of the uniform compression device 100 between the lower end plate 13 and the cell stack 10, the lower end plate 13 is preferred to be formed, at a side facing the cell stack 10, with a recess 132 adapted to receive the uniform compression device 100 therein.

Figure 5:
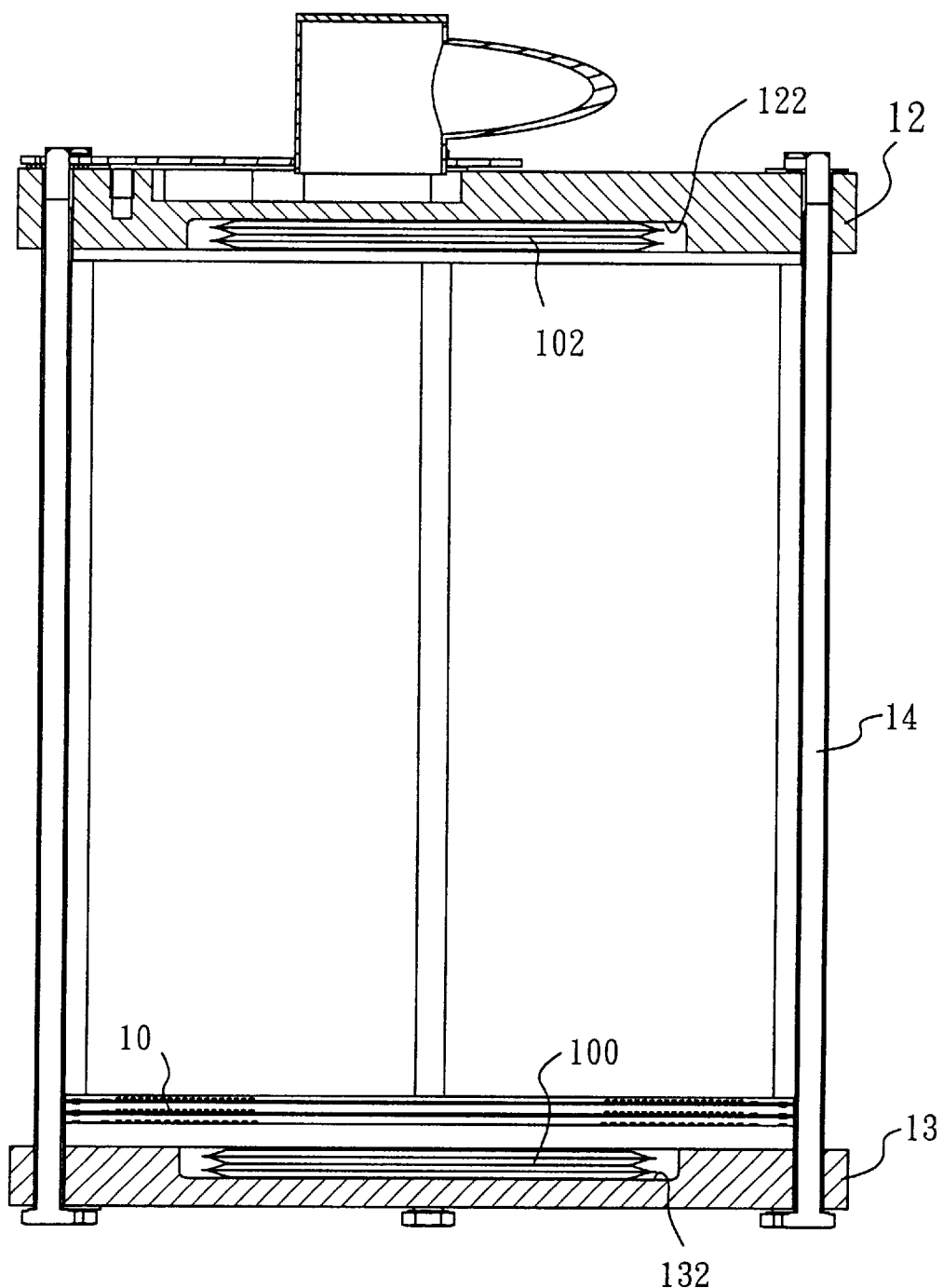
FIG. 5 is a cross-sectional, schematic view showing a fuel cell with a uniform compression device according to an alternative, preferred embodiment of this invention.

FIG. 5 is a cross-sectional, schematic view showing an alternative, preferred embodiment of this invention. In this embodiment, the upper end plate 12 and the cell stack 10 are further provided with another pressure bellows therebetween. As shown in FIG. 5, the upper end plate 13 is also, at a side facing the cell stack 10, with a recess 122 adapted to receive the uniform compression device 102 therein.

To maintain the pressure under which the cell stack 10 sustains to a required pressure range, the following formula can be used to roughly calculate the pressure to be pumped into the pressure bellows, wherein P represents pressure, A represents area:

$$P_{cell\ unit} \times A_{cell\ unit} = P_{pressurel\ bellows} \times A_{pressure\ bellows}$$

Since values of $A_{cell\ unit}$ and $A_{pressure\ bellows}$ are known, if one intends to maintain the pressure under which the cell stack 10 sustains to be within the range of 95 to 105 psi, the value of $P_{pressurel\ bellows}$ is easily obtained by inserting the values of $A_{cell\ unit}$, $A_{pressure\ bellows}$, and $P_{pressurel\ bellows}$ (such as 100 psi) into the above formula.

Because the uniform compression devices 100, 102 of this invention are made of a metallic pressure bellows, the tendency of pressure leakage is reduced. Further, the pressure bellows constantly applies consistent and symmetrical pressure to the cell stack 10 in a "planar" manner, whereby such a uniform compression device can be adapted to adjust the pressure variation caused by thermal expansion, and to compensate the height deviation resulting from stacking the cell units into a cell stack, thereby enhancing the operative efficiency of the fuel cell.

This invention is related to a novel creation that makes a breakthrough to conventional art. Aforementioned explanations, however, are directed to the description of preferred embodiments according to this invention. Various changes and implementations can be made by persons skilled in the art without departing from the technical concept of this invention. Since this invention is not limited to the specific details described in connection with the preferred embodiments, changes to certain features of the preferred embodiments without altering the overall basic function of the invention are contemplated within the scope of the appended claims.

What is claimed is:

1. A fuel cell system comprising:
   first and second end plates, each having a central region and a peripheral region;
   a fuel cell stack disposed between the central regions of the first and second end plates;
   a tightening device, extending between the periphery regions of the first and second end plates for positioning the fuel cell stack between the first and second end plates; and
   a uniform compression device coupled to the fuel cell stack, the uniform compression device including at least one pneumatic pressure bellows, disposed between the fuel cell stack and the first end plates to maintain planar surface engagement with the fuel cell stack.

2. The fuel cell system according to claim 1, wherein the uniform compression device includes a second pneumatic pressure bellows disposed between the fuel cell stack and second end plate.

3. The fuel cell system according to claim 1, wherein the uniform compression device constantly applies pressure within a pressure range of 95 to 105 psi to the fuel cell stack.

4. The fuel cell system according to claim 2, wherein the first and second end plates are each formed with a recess adapted to receive and position at least one of the pneumatic pressure bellows.

5. The fuel cell system according to claim 1, wherein the at least one pneumatic pressure bellows is made of metallic material.

6. The fuel cell system according to claim 1, wherein the first end plate forms a lower end plate disposed beneath the fuel cell stack.

7. The fuel cell system according to claim 1, wherein the first end plate forms an upper end plate disposed above the fuel cell stack.

* * * * *